United States Patent
Yu

(10) Patent No.: US 7,773,469 B2
(45) Date of Patent: *Aug. 10, 2010

(54) METHODS FOR TUNING WRITE STRATEGY PARAMETERS UTILIZING DATA-TO-CLOCK EDGE DEVIATIONS, AND SYSTEMS THEREOF

(75) Inventor: Chih-Ching Yu, Hsinchu (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 945 days.

This patent is subject to a terminal disclaimer.

(21) Appl. No.: 11/538,813

(22) Filed: Oct. 5, 2006

(65) Prior Publication Data

US 2008/0123500 A1   May 29, 2008

Related U.S. Application Data

(63) Continuation-in-part of application No. 10/908,580, filed on May 18, 2005.

(51) Int. Cl.
    *G11B 7/00*   (2006.01)
(52) U.S. Cl. .................. 369/44.32; 369/59.11
(58) Field of Classification Search .............. 369/44.32, 369/59.11
    See application file for complete search history.

(56) References Cited

U.S. PATENT DOCUMENTS

| | | | |
|---|---|---|---|
| 5,347,505 A | 9/1994 | Moritsugu et al. | |
| 6,157,604 A | 12/2000 | Feyh | |
| 6,212,142 B1 | 4/2001 | Shoji et al. | |
| 6,388,970 B1 | 5/2002 | Iizuka | |
| 6,535,470 B1 | 3/2003 | Wu | |
| 6,574,178 B2 | 6/2003 | Tieke et al. | |
| 6,631,110 B1 | 10/2003 | Seo et al. | |
| 6,775,217 B1 * | 8/2004 | Kato et al. | 369/59.2 |
| 6,925,041 B2 | 8/2005 | Kui et al. | |
| 7,006,420 B1 | 2/2006 | Hsu | |
| 7,224,660 B2 * | 5/2007 | Nakajo | 369/59.11 |
| 7,263,050 B2 * | 8/2007 | Liu et al. | 369/59.12 |
| 2002/0018417 A1 | 2/2002 | Morishima | |
| 2002/0159352 A1 | 10/2002 | Yamada | |
| 2003/0058765 A1 | 3/2003 | Schreurs et al. | |
| 2003/0151994 A1 | 8/2003 | Tasaka et al. | |
| 2004/0136306 A1 | 7/2004 | Chao | |
| 2004/0141437 A1 | 7/2004 | Usami | |
| 2004/0145985 A1 * | 7/2004 | Osakabe | 369/47.53 |
| 2004/0160874 A1 | 8/2004 | Hwang et al. | |
| 2005/0099925 A1 | 5/2005 | Nakajo | |
| 2008/0013431 A1 * | 1/2008 | Yu et al. | 369/59.11 |

(Continued)

FOREIGN PATENT DOCUMENTS

CN        1822126        8/2006

(Continued)

*Primary Examiner*—Van N Chow
(74) *Attorney, Agent, or Firm*—Winston Hsu

(57) ABSTRACT

A method for tuning a plurality of write strategy parameters of an optical storage device includes detecting a plurality of lengths, each length corresponding to a pit or a land on an optical storage medium accessed by the optical storage device, performing calculations corresponding to a plurality of data set types and generating a plurality of data-to-clock edge deviations respectively corresponding to the data set types, and utilizing the data-to-clock edge deviations for tuning the write strategy parameters corresponding to the data set types respectively.

30 Claims, 13 Drawing Sheets

U.S. PATENT DOCUMENTS

2008/0123500 A1 * 5/2008 Yu .......................... 369/59.11

FOREIGN PATENT DOCUMENTS

| JP | 07-235055 | 9/1995 |
| JP | 2000-207742 | 7/2000 |
| JP | 2001-126254 | 5/2001 |
| JP | 2002-063721 | 2/2002 |
| JP | 2002-074669 | 3/2002 |
| JP | 2002-312938 | 10/2002 |
| JP | 2003-085753 | 3/2003 |

* cited by examiner

METHODS FOR TUNING WRITE STRATEGY PARAMETERS UTILIZING DATA-TO-CLOCK EDGE DEVIATIONS, AND SYSTEMS THEREOF

CROSS REFERENCE TO RELATED APPLICATIONS

This application is a continuation-in-part application and claims the benefit of U.S. application Ser. No. 10/908,580, which was filed on May 18, 2005, and entitled "METHODS FOR TUNING WRITE STRATEGY PARAMETERS UTILIZING DATA-TO-CLOCK EDGE DEVIATIONS, AND SYSTEMS THEREOF".

BACKGROUND

The present invention relates to write strategy tuning of an optical storage device, and more particularly, to methods and systems for tuning write strategy parameters utilizing data-to-clock edge deviations.

As multimedia applications continue to progress, the demand for storing massive digital data increases rapidly. As a result, high storage volume and compact size optical storage media such as Compact Discs (CDs) or Digital Versatile Discs (DVDs) are very popular, and optical storage devices such as CD drives or DVD drives have become standard accessories of personal computers, utilized for performing the multimedia applications.

Take the CD drive as an example. When the CD drive is controlled to write data to a CD-Recordable (CD-R) disc, the writing power of a laser diode in the CD drive is usually set to be a specific value, and write pulses corresponding to the data are utilized for recording pits and lands onto the grooves of the CD-R disc. The specific value of the writing power can be derived from an optimal power calibration (OPC) process. On the other hand, through a write strategy tuning process, which is also referred to as a recording strategy tuning process, changing write strategy parameters for controlling widths of the write pulses may increase the accuracy of lengths of pits and lands formed on the CD-R disc. Please refer to related documents of the CD-R specifications (e.g. the Orange Book Part I) for more information.

According to the related art, a specific device such as an oscilloscope can be utilized during the write strategy tuning process. Usually, according to an eye pattern of a plurality of reproduced waveforms shown on the oscilloscope after a trial writing process in advance, a new set of write strategy parameters for controlling the widths of the write pulses are determined, based on experience, by an engineer or researcher. It takes a lot of engineer or researcher's time to utilize this method because the same process must be repeatedly performed for various applicable media and different recording speeds, including at least writing test data, inspecting an eye pattern of reproduced waveforms shown on the oscilloscope, and determining a new set of write strategy parameters by experience according to the eye pattern. The write strategy tuning process mentioned above is time consuming since determining the write strategy parameters by inspecting eye patterns is not an automatic operation. In addition, the write strategy tuning process mentioned above is indefinite since determining a new set of write strategy parameters by experience according to the eye pattern is not quantitative. Under certain situations, an unclear eye pattern would invalidate or interfere with the write strategy tuning process.

A specific instrument such as a time interval analyzer (TIA) or a jitter meter might be helpful for the purpose of deriving information for determining a new set of write strategy parameters. However, similar routine work is also required, and if the TIA or jitter meter is simply coupled for measuring without setting up an additional control system, the same drawbacks caused by the manual tuning process still existed. In addition, the information derived from the specific instrument is usually implicit and therefore takes up a large amount of experienced engineer or researcher's time.

SUMMARY

It is an objective of the claimed invention to provide methods and systems for tuning a plurality of write strategy parameters of an optical storage device.

An exemplary embodiment of a method for tuning write strategy parameters comprises detecting a plurality of lengths, each length corresponding to a pit or a land on an optical storage medium accessed by an optical storage device, and performing calculations corresponding to a plurality of data set types comprising at least one pit-land-pit data set type and/or at least one land-pit-land data set type and generating data-to-clock edge deviations which respectively correspond to the data set types. The data-to-clock edge deviations are utilized for tuning the write strategy parameters respectively corresponding to the data set types.

An exemplary embodiment of a system for tuning write strategy parameters of an optical storage device comprises a detector, a calculation module, and a controller. The detector detects a plurality of lengths, each length corresponding to a pit or a land on an optical storage medium accessed by the optical storage device. The calculation module coupled to the detector performs calculations corresponding to data set types comprising at least one pit-land-pit data set type and/or at least one land-pit-land data set type, and generates data-to-clock edge deviations which respectively correspond to the data set types. The controller is coupled to the detector and the calculation module, and the controller utilizes the data-to-clock edge deviations for tuning the write strategy parameters respectively corresponding to the data set types.

An exemplary embodiment of a method for tuning write strategy parameters comprises: detecting a plurality of lengths, each length corresponding to a pit or a land on an optical storage medium accessed by an optical storage device; performing calculations corresponding to a plurality of data set types and generating a plurality of data-to-clock edge deviations respectively corresponding to the data set types; and utilizing the adjustment amounts for tuning the write strategy parameters. The step of performing calculations corresponding to the data set types and generating the data-to-clock edge deviations respectively corresponding to the data set types further comprises: deriving the data set types whose data-to-clock edge deviations are greater than a first threshold; within the data set types whose data-to-clock edge deviations are greater than the first threshold, deriving the data set types whose data sets occur more than the times indicated by a second threshold; and calculating the adjustment amounts of the write strategy parameters corresponding to the data set types whose data sets occur more than the times indicated by the second threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention provides systems for tuning a plurality of write strategy parameters of an optical storage device. According to a first aspect, one of the systems is a circuit for tuning the write strategy parameters, where the circuit is positioned in the optical storage device. According to a second aspect, one of the systems is substantially the optical storage device itself. For simplicity, the first aspect is utilized in the following description. However, the second aspect is also applicable to the detailed embodiments.

Figure 1:
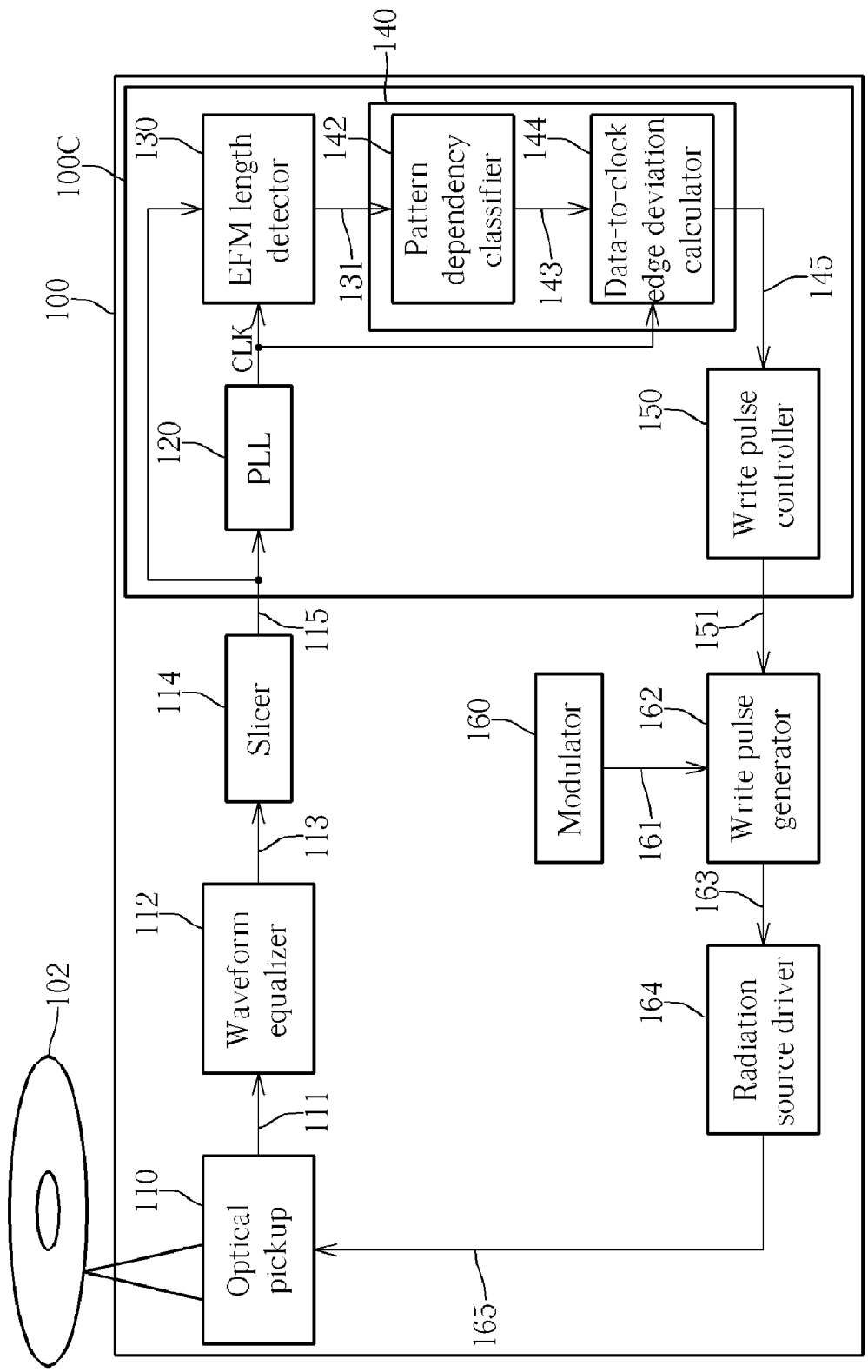
FIG. 1 is a block diagram of a system for tuning write strategy parameters of an optical storage device according to one embodiment of the present invention.

FIG. 1 illustrates a block diagram of a system 100C for tuning a plurality of write strategy parameters of an optical storage device 100 according to a first embodiment, where the system 100C is a circuit positioned in the optical storage device 100 accessing an optical storage medium 102. Please note that for simplicity, this embodiment is described utilizing a CD-R disc as the optical storage medium 102 and utilizing a CD drive as the optical storage device 100. Those skilled in the art should understand that other kinds of optical storage media such as DVD-R discs, DVD-RW discs, DVD+R discs, DVD+RW discs, or DVD-RAM discs, and corresponding optical storage devices such as DVD drives are applicable according to other embodiments of the present invention.

As shown in FIG. 1, an optical pickup 110 of the optical storage device 100 reads data from the optical storage medium 102 to generate a raw radio frequency (RF) signal 111 in a reading mode of the optical storage device 100. A waveform equalizer 112 of the optical storage device 100 equalizes the raw RF signal 111 to generate a reproduced signal, which is the RF signal 113 in the first embodiment. In addition, a slicer 114 of the optical storage device 100 slices the RF signal 113 to generate a sliced signal 115. Operation principles of the optical pickup 110, the waveform equalizer 112, and the slicer 114 are well known in the art and therefore not described in detail here.

Within the optical storage device 100 shown in FIG. 1, a modulator 160, a write pulse generator 162, and a radiation source driver 164 co-operate to drive the optical pickup 110 according to the write strategy parameters, which can be tuned by the system 100C through a control signal 151 according to the sliced signal 115. The modulator 160 is coupled to an encoder (not shown) of the optical storage device 100 for modulating encoded data outputted by the encoder to generate a modulated signal 161 carrying eight-to-fourteen modulation (EFM) information. The write pulse generator 162 generates write pulses corresponding to the EFM information carried by the modulated signal 161 according to the write strategy parameters mentioned above, and outputs the write pulses carried by a write pulse signal 163. In addition, the radiation source driver 164 generates a driving signal 165 according to the write pulse signal 163 to drive the optical pickup 110. Operation principles of the modulator 160, the write pulse generator 162, and the radiation source driver 164 are well known in the art and therefore not described in detail here.

According to this embodiment, the system 100C comprises a phase-locked loop (PLL) 120, a detector such as an EFM length detector 130 shown in FIG. 1, a calculation module 140, and a controller such as a write pulse controller 150 shown in FIG. 1, where the calculation module 140 comprises a pattern dependency classifier 142 and a data-to-clock edge deviation calculator 144. The PLL 120 generates an EFM data clock CLK according to the sliced signal 115 by locking the channel bit rate (1/T) of the sliced signal 115, where the period of the EFM data clock CLK is considered to be 1T. The EFM length detector 130 derives EFM information carried by the sliced signal 115 according to the EFM data clock CLK, and detects a plurality of lengths, where each length corresponds to a pit or a land recorded on the optical storage medium 102. The sliced signal 115 is typically a square wave having various intervals between rising edges and falling edges thereof and various intervals between falling edges and rising edges thereof. In this embodiment, the EFM length detector 130 measures intervals between rising edges and falling edges of the sliced signal 115 and/or intervals between falling edges and rising edges of the sliced signal 115 as the lengths mentioned above, where each interval corresponds to a pit or a land. As a result, the lengths comprise pit lengths P corresponding to pits, and land lengths L corresponding to lands. Each of the pit lengths P represents a pit recorded along a groove on the optical storage medium 102, and each of the land lengths L represents a land along the groove. Please note that the sliced signal 115 of another embodiment of the present invention may carry EFM plus (EFM+) information (e.g. for an embodiment of DVD-R) or other information complying with a variation of the EFM/EFM+ specification.

In the first embodiment, the pit lengths and the land lengths derived from the sliced signal 115 are multiples of clock period T and ranging from 3T to 11T in an ideal case of the CD-R disc. That is, a length P of a pit or a length L of a land can be 3T, 4T, . . . , or 11T. So it is reasonable that a reference signal for measuring the lengths of the pits and the lands (e.g. the EFM data clock CLK) has a period less than or equal to T. According to this embodiment, the reference signal inputted into the EFM length detector 130 is the EFM data clock CLK, so the period of the reference clock is T. In a real case of the CD-R disc, the lengths L and P carried by the output signal 131 of the EFM length detector 130 are usually not exact multiples of T. The calculation module 140 may perform calculations corresponding to a plurality of data set types comprising at least one pit-land-pit data set type and/or at least one land-pit-land data set type, and generate a plurality of data-to-clock edge deviations respectively corresponding to the data set types, where the data-to-clock edge deviations are carried by an output signal 145 of the data-to-clock edge deviation calculator 144. Each of the data set types corresponds to a combination of at least a specific target pit length (e.g. 3T, 4T, . . . , 11T) and a specific target land length (e.g. 3T, 4T, . . . , 11T) and further a specific target pit length (e.g. 3T, 4T, . . . , 11T) or a combination of at least a specific target land length and a specific target pit length and further a specific target land length.

The pattern dependency classifier 142 classifies a plurality of data sets into the data set types. In this embodiment, each data set, being (P1, L, P2) or (L1, P, L2), comprises two lengths, where a data set (P1, L, P2) means one length corresponds to a land and another two respectively correspond to two adjacent pits, and a data set (L1, P, L2) means one length corresponds to a pit and another two respectively correspond to two adjacent lands. Here, notation such as $(P_{nT}, L_{mT}, P_{lT})$ or $(L_{nT}, P_{mT}, L_{lT})$ is utilized for denoting the data set types mentioned above, where nT, mT, or lT indicates the length in terms of the clock period T, n=3, 4, . . . , 11, and m=3, 4, . . . , 11, and l=3, 4, . . . , 11 in this embodiment. Each of the data set types $(L_{nT}, P_{mT}, L_{lT})$, e.g. a data set type $(L_{n0*T}, P_{m0*T}, L_{l0*T})$ having n=n0 and m=m0 and l=l0, is utilized for classifying data sets (L1, P, L2) corresponding to a land having a target land length of n0*T followed by an adjacent pit having a target pit length of m0*T and further followed by an adjacent land having a target land length of l0*T. Similarly, each of the data set types $(P_{nT}, L_{mT}, P_{lT})$, e.g. a data set type $(P_{n0*T}, L_{m0*T}, P_{l0*T})$ having n=n0 and m=m0 and l=l0, is utilized for classifying data sets (P1, L, P2) corresponding to a pit having a target pit length of n0*T followed by an adjacent land having a target land length of m0*T and further followed by an adjacent pit having a target pit length of l0*T. It is noted that each of the data set types $(L_{nT}, P_{mT}, L_{lT})$, e.g. the data set type $(L_{n0*T}, P_{m0*T}, L_{l0*T})$, corresponds to a combination (n0*T, m0*T, l0*T) of a specific target land length n0*T and a specific target pit length m0*T and further a specific target land length l0*T, and each of the data set types $(P_{nT}, L_{mT}, P_{lT})$, e.g. the data set type $(P_{n0*T}, L_{m0*T}, P_{l0*T})$, corresponds to a combination (n0*T, m0*T, l0*T) of a specific target pit length n0*T and a specific target land length m0*T and further a specific target pit length l0*T. There are 9 possible values for n and m and l, so there are 9*9*9 combinations for each of the data set types $(L_{nT}, P_{mT}, L_{lT})$ and $(P_{nT}, L_{mT}, P_{lT})$, and the total number of data set types would be 9*9*9*2=1458.

In practice, some combinations can be selected so the write strategy parameters can be adjusted according to these selected combinations rather than all the possible combinations.

In addition, the pattern dependency classifier 142 may classify the data sets (L1, P, L2) as data set type $(L_{n0*T}, P_{m0*T}, L_{l0*T})$ if the lengths L1, P, and L2 satisfy:

$(n0-0.5)*T \leq L1 \leq (n0+0.5)*T;$ $(m0-0.5)*T \leq P \leq (m0+0.5)*T;$ and $(l0-0.5)*T \leq L2 \leq (l0+0.5)*T.$ Similarly, the pattern dependency classifier 142 may classify the data sets (P1, L, P2) as data set type $(P_{n0*T}, L_{m0*T}, P_{l0*T})$ if the lengths P1, L and P2 satisfy:

$(n0-0.5)*T \leq P1 \leq (n0+0.5)*T;$ $(m0-0.5)*T \leq L \leq (m0+0.5)*T;$ and $(l0-0.5)*T \leq P2 \leq (l0+0.5)*T.$ The data-to-clock edge deviation calculator 144 may calculate the data-to-clock edge deviations respectively corresponding to the data set types $(L_{nT}, P_{mT}, L_{lT})$ and $(P_{nT}, L_{mT}, P_{lT})$ as follows. The data-to-clock edge deviation calculator 144 calculates a plurality of data-to-clock edge lengths, where each data-to-clock edge length is an interval between a rising/falling edge of the reference clock mentioned above (i.e. the EFM data clock CLK in this embodiment) and a transition edge of the sliced signal 115. Additionally, the data-to-clock edge deviation calculator 144 calculates a plurality of differences to generate the data-to-clock edge deviations respectively corresponding to the data set types $(L_{nT}, P_{mT}, L_{lT})$ and $(P_{nT}, L_{mT}, P_{lT})$. Each of the differences mentioned above is a difference between a data-to-clock edge length and a target data-to-clock edge length that is a predetermined value corresponding to a specific data set type $(L_{n0*T}, P_{m0*T}, L_{l0*T})$ or $(P_{n0*T}, L_{m0*T}, P_{l0*T})$.

Figure 2:
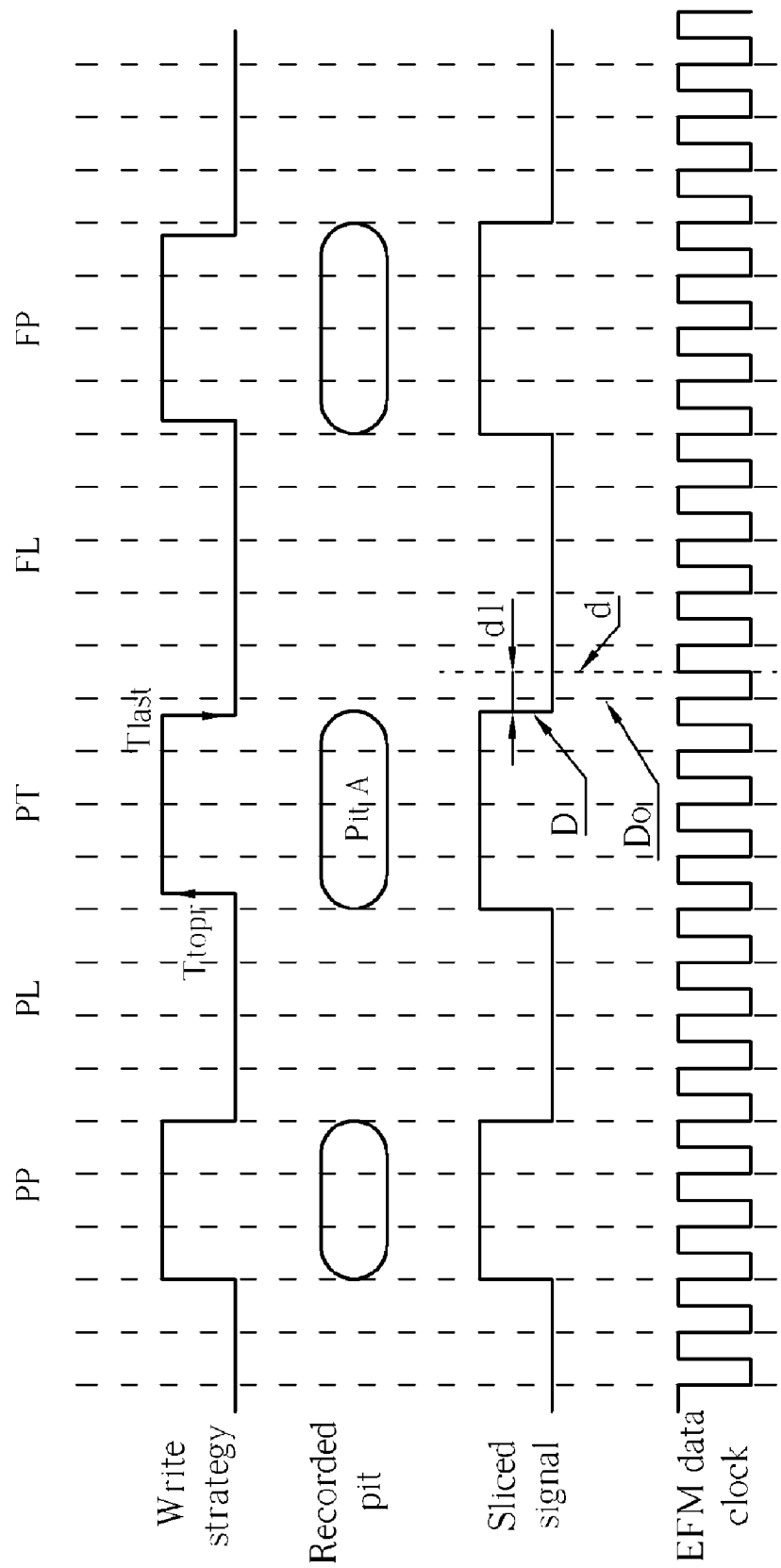
FIG. 2 is a length compensation illustration utilizing data-to-clock edge deviations according to one embodiment of the present invention.

Take the situation shown in FIG. 2 as an example. FIG. 2 is a length compensation illustration utilizing the data-to-clock edge deviations according to the first embodiment, where pit A corresponds to a target length $P_{4T}$ (i.e. the target length of 4T-pit). As shown in FIG. 2, Ttopr and Tlast respectively denote write strategy parameters for controlling the beginning location and the end location of pits. In the situation shown in FIG. 2, pit A is considered to be a pit PT, whose end location is not perfect in this situation, that is, an edge deviation can be measured at the end location of the pit PT. The previous land PL has a target length $L_{4T}$ (i.e. the target length of 4T-land), and the previous pit PP has a target length $P_{3T}$. In addition, the following land FL has a target length $L_{5T}$, and the following pit FP has a target length $P_{4T}$. Here, the patterns (PP, PL, PT) and (PT, FL, FP) correspond to the at least one pit-land-pit data set type mentioned above, and the pattern (PL, PT, FL) corresponds to the at least one land-pit-land data set type mentioned above.

According to the calculations (more particularly, statistical calculations) respectively corresponding to data set types of the patterns (PP, PL, PT), (PL, PT, FL), and (PT, FL, FP)

performed by the calculation module 140, a statistical result can be derived to indicate that one of the patterns (PP, PL, PT), (PL, PT, FL), and (PT, FL, FP) dominates the imperfect end of the pit PT, for example, the pattern (PT, FL, FP) dominates the imperfect end of the pit PT, then the corresponding write strategy parameters Tlast(n, m, l), which represent the write strategy parameters for controlling the end location of the pits corresponding to the data set types ($P_{nT}$, $L_{mT}$, $P_{lT}$), should be tuned to adjust such an imperfect end of the pit PT, where (n, m, l)=(4, 5, 4) according to the situation shown in FIG. 2.

It is noted that the data-to-clock edge deviation calculator 144 calculates a data-to-clock edge length d1. In this embodiments, the data-to-clock edge length d1 is an interval between time point D of a falling edge of the sliced signal 115, i.e. the time point corresponding to the end location of pit A, and a subsequent rising edge of the EFM data clock CLK, e.g. time point d. Please note that time point D is substantially the same time point as when the value of the RF signal 113 crosses the predetermined value such as the value corresponding to the slicing level of the slicer 114. The data-to-clock edge deviation calculator 144 detects time point D by detecting the transition of the sliced signal 115 from high to low. Same method can be applied to calculate the data-to-clock edge lengths corresponding to data set type ($P_{4T}$, $L_{5T}$, $P_{4T}$). Additionally, the data-to-clock edge deviation calculator 144 calculates a plurality of differences to generate data-to-clock edge deviations corresponding to the data set types. In some embodiments, the data-to-clock edge deviation calculator 144 generates the data-to-clock edge deviation of a particular data set type by conducting statistics analysis on the differences corresponding to the data set type. The statistics analysis may be averaging the difference, or finding the most frequent value of the differences. Each of the differences mentioned above is a difference between a data-to-clock edge length and a target data-to-clock edge length, for example, 0.5T in the situation shown in FIG. 2. The target data-to-clock edge length corresponding to data set types ($P_{4T}$, $L_{5T}$, $P_{4T}$) is 0.5T because the time point corresponding to the end location of pit A in an ideal case is supposed to be time point Do.

Figure 3:
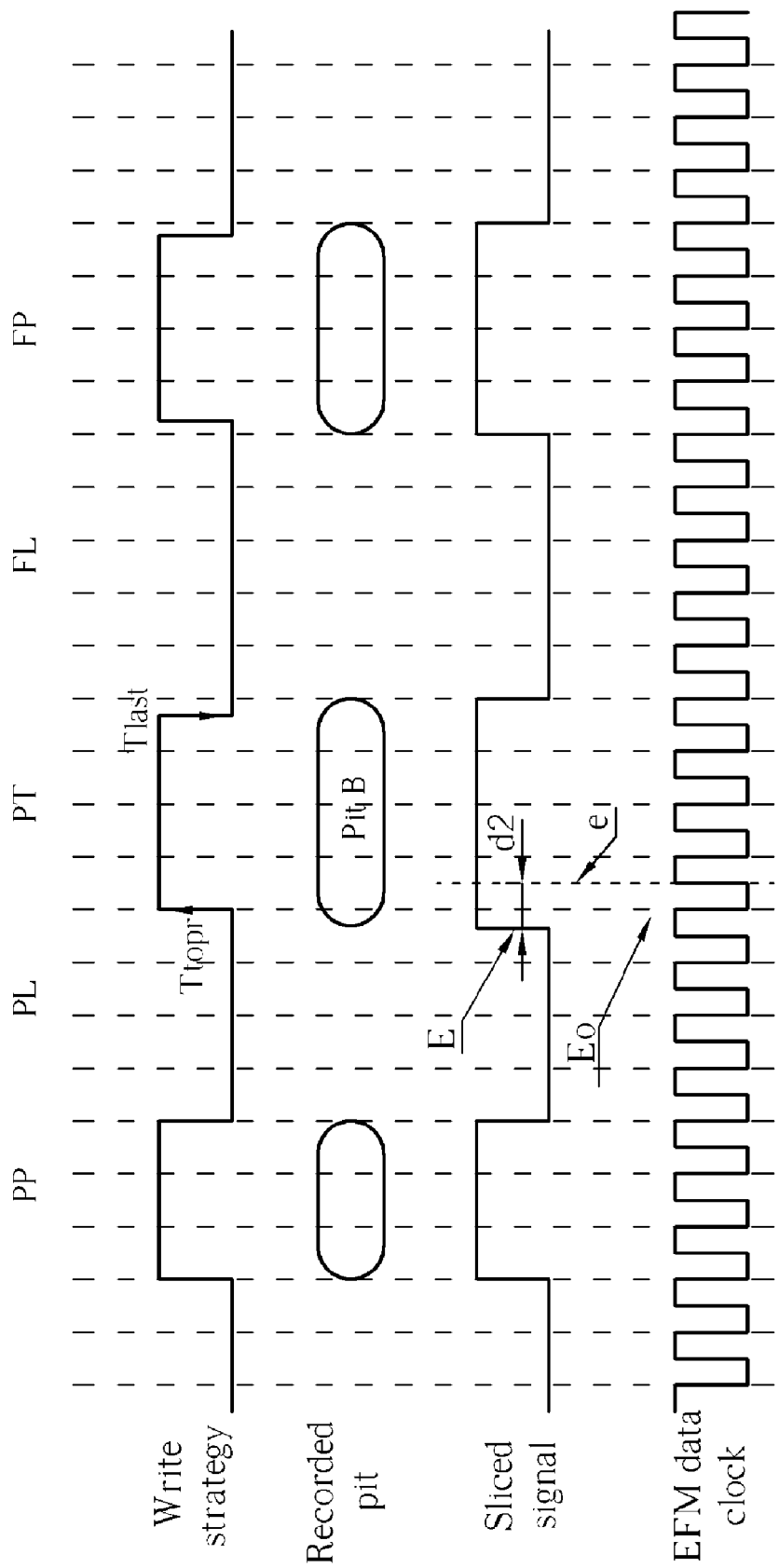
FIG. 3 is a length compensation illustration utilizing data-to-clock edge deviations according to one embodiment of the present invention.

Take the situation shown in FIG. 3 as another example. FIG. 3 is a length compensation illustration utilizing the data-to-clock edge deviations according to the first embodiment, where pit B also corresponds to a target length $P_{4T}$. In the situation shown in FIG. 3, pit B is considered to be the pit PT, whose beginning location is not perfect in this situation, that is, an edge deviation can be measured at the beginning location of the pit PT.

Similarly, according to the calculations respectively corresponding to data set types of the patterns (PP, PL, PT), (PL, PT, FL), and (PT, FL, FP) performed by the calculation module 140, a statistical result can be derived to indicate that one of the patterns (PP, PL, PT), (PL, PT, FL), and (PT, FL, FP) dominates the imperfect beginning of the pit PT, for example, the pattern (PP, PL, PT) dominates the imperfect beginning of the pit PT, then the corresponding write strategy parameters Ttopr(n, m, l), which represent the write strategy parameters for controlling the beginning location of the pits corresponding to the data set types ($P_{nT}$, $L_{mT}$, $P_{lT}$), should be tuned to adjust such an imperfect beginning of the pit PT, where (n, m, l)=(3, 4, 4) according to the situation shown in FIG. 3.

It is noted that the data-to-clock edge deviation calculator 144 calculates a data-to-clock edge length d2, which is an interval between time point E of a rising edge of the sliced signal 115, i.e. the time point corresponding to the beginning location of pit B and a subsequent rising edge of the EFM data clock CLK, e.g. time point e. Please note that time point E is substantially the same time point as when the value of the RF signal 113 crosses the predetermined value such as the value corresponding to the slicing level of the slicer 114. The data-to-clock edge deviation calculator 144 detects time point E by detecting transition of the sliced signal 115 from low to high. Same method can be applied to calculate the data-to-clock edge lengths corresponding to data set type ($P_{3T}$, $L_{4T}$, $P_{4T}$). Additionally, the data-to-clock edge deviation calculator 144 calculates a plurality of differences to generate data-to-clock edge deviations corresponding to the data set types, where each of the differences mentioned above is a difference between a data-to-clock edge length and a target data-to-clock edge length. In the situation shown in FIG. 3, the target data-to-clock edge length corresponding to data set type ($P_{3T}$, $L_{4T}$, $P_{4T}$) is determined to be 0.5T because the time point corresponding to the beginning location of pit B in an ideal case is supposed to be time point Eo.

It is noted that the classification information generated by the pattern dependency classifier 142 can be sent to the write pulse controller 150 through the data-to-clock edge deviation calculator 144 if needed since the transmission from the data-to-clock edge deviation calculator 144 to the write pulse controller 150 is digital. Similarly, the detection result(s) generated by the EFM length detector 130 can be sent to the data-to-clock edge deviation calculator 144 through the pattern dependency classifier 142 if needed since the transmission from the pattern dependency classifier 142 to the data-to-clock edge deviation calculator 144 is digital. In a variation of the first embodiment, the write pulse controller 150 can be coupled to the pattern dependency classifier 142 through direct connection, and the data-to-clock edge deviation calculator 144 can also be coupled to the EFM length detector 130 through direct connection.

In a variation of the first embodiment, the target data-to-clock edge length utilized for calculating the differences to generate the data-to-clock edge deviations corresponding to a specific data set type ($L_{n0*T}$, $P_{m0*T}$, $L_{l0*T}$) can be an average of a plurality of data-to-clock edge lengths corresponding to the specific data set type ($L_{n0*T}$, $P_{m0*T}$, $L_{l0*T}$). Similarly, the target data-to-clock edge length utilized for calculating the differences to generate the data-to-clock edge deviations corresponding to a specific data set type ($P_{n0*T}$, $L_{m0*T}$, $P_{l0*T}$) can be an average of a plurality of data-to-clock edge lengths corresponding to the specific data set type ($P_{n0*T}$, $L_{m0*T}$, $P_{l0*T}$). In another variation of the first embodiment, the target data-to-clock edge length utilized for calculating the differences to generate the data-to-clock edge deviations corresponding to a specific data set type ($L_{n0*T}$, $P_{m0*T}$, $L_{l0*T}$) or ($P_{n0*T}$, $L_{m0*T}$, $P_{l0*T}$) can be an average of a plurality of data-to-clock edge lengths corresponding to the specific data set type ($L_{n0*T}$, $P_{m0*T}$, $L_{l0*T}$) and a plurality of data-to-clock edge lengths corresponding to the specific data set type ($P_{n0*T}$, $L_{m0*T}$, $P_{l0*T}$).

It is noted that the write strategy parameters such as Ttopr (n, m, l) and Tlast(n, m, l) can be tuned automatically since specific devices (e.g. the oscilloscope mentioned above) are no longer required according to the present invention. In addition, without the agency of external devices, the write pulse controller 150 may tune the write strategy parameters according to the data-to-clock edge deviations generated by the calculation module 140, so the write strategy parameters can be tuned automatically on system or on chip according to the present invention. Through tuning the write strategy parameters according to the data-to-clock edge deviations, pit lengths or land lengths corresponding to data newly written on the optical storage medium 102 utilizing the latest updated write strategy parameters may approach target multiples of T.

Figure 4:
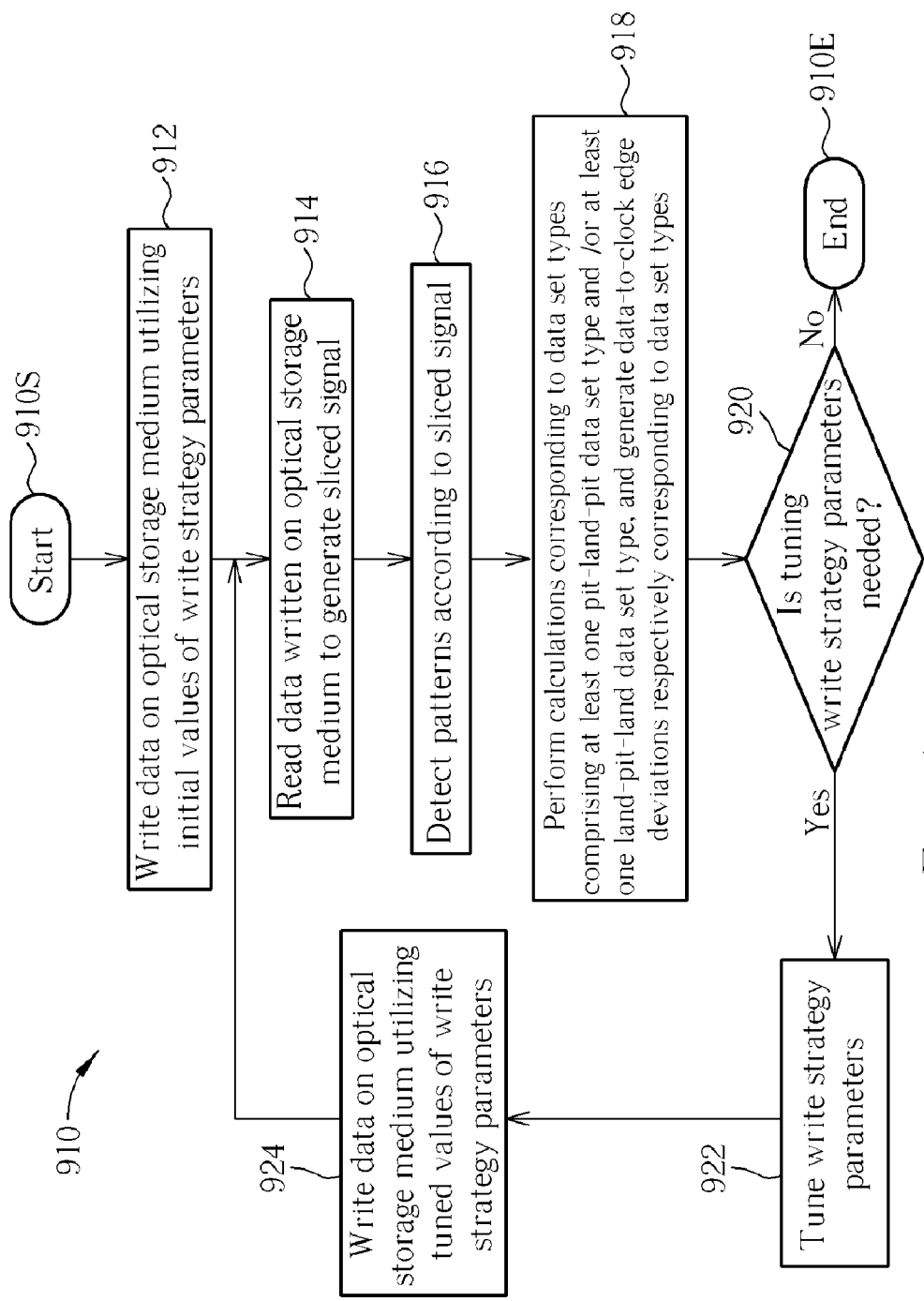
FIG. 4 is a flowchart of a method for tuning write strategy parameters according to one embodiment of the present invention.

FIG. 4 illustrates a flowchart of a method 910 for tuning write strategy parameters of an optical storage device according to one embodiment of the present invention. The method 910 may be implemented by system 100C shown in FIG. 1.

In Step 912, under the control of a firmware code executed by a micro-processing unit (MPU) of the optical storage device 100, the optical storage device 100 writes data on the optical storage medium 102 utilizing initial values of the write strategy parameters corresponding to a specific rotational speed of the optical storage device 100.

In Step 914, the optical storage device 100 reads the data newly written on the optical storage medium 102 to generate the sliced signal 115.

In Step 916, the EFM length detector 130 of the system 100C detects lengths P of pits and lengths L of lands by measuring the sliced signal 115.

In Step 918, the calculation module 140 calculates data-to-clock edge deviations corresponding to data set types ($L_{nT}$, $P_{mT}$, $L_{lT}$) and ($P_{nT}$, $L_{mT}$, $P_{lT}$), which comprises at least one pit-land-pit data set type and/or at least one land-pit-land data set type as mentioned, where n=3, 4, . . . , 11 and m=3, 4, . . . , 11 and l=3, 4, . . . , 11 in this embodiment.

In Step 920, the MPU executing the firmware code determines if tuning of the write strategy parameters is needed. If any of the data-to-clock edge deviations is greater than a specific threshold, the MPU executing the firmware code determines that tuning of the write strategy parameters is needed, so Step 922 will be executed; otherwise, enter Step 910E. The MPU may determine to enter Step 922 directly without examining Step 920 if initial values of the write strategy parameters are certain to be imperfect. In addition, although the write strategy parameters described in Steps 920 and 922 are plural write strategy parameters for simplicity as shown in FIG. 2, this is not a limitation of the present invention. Both Steps 920 and 922 can be described utilizing a singular form of "write strategy parameter" if tuning of only a single write strategy parameter is needed. Repeated explanation of the singular or plural form for similar situations is therefore unnecessary in the following.

If the MPU executing the firmware code determines to enter Step 922, the system 100C tunes the write strategy parameters utilizing the data-to-clock edge deviations as mentioned.

In Step 924, under the control of the MPU executing the firmware code, the optical storage device 100 writes data on the optical storage medium 102 utilizing the latest values of the write strategy parameters.

Please note that the number of data set types ($L_{nT}$, $P_{mT}$, $L_{lT}$) and ($P_{nT}$, $L_{mT}$, $P_{lT}$) according to another embodiment implemented for DVD-R disc or DVD+R disc mentioned above can be derived as follows:

10*10*10*2=2000;

since n=3, 4, . . . , 11, 14 and m=3, 4, . . . , 11, 14 and l=3, 4, . . . , 11, 14 for the DVD-R disc or the DVD+R disc.

Similarly, in practice, some combinations can be selected so the write strategy parameters can be adjusted according to these selected combinations rather than all the possible combinations.

Figure 5:
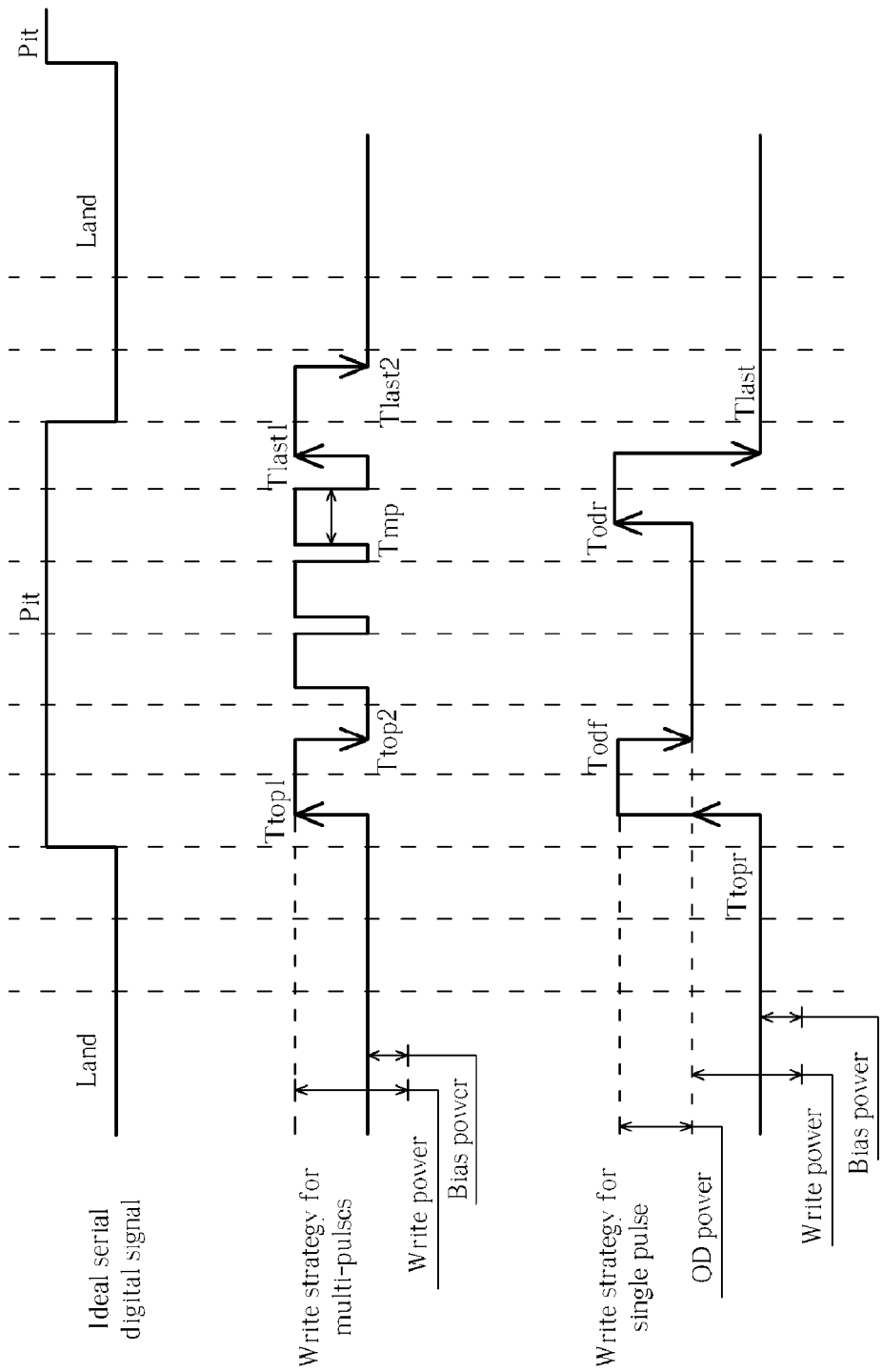
FIG. 5 illustrates write strategy parameters that can be respectively tuned by utilizing the length deviation statistics according to different embodiments of the present invention.

FIG. 5 illustrates the write strategy parameters that can be respectively tuned by utilizing the length deviation statistics according to different embodiments of the present invention, where the write strategy parameters shown in FIG. 5 are applicable to writing DVD-R discs, and the write strategy parameters of a write strategy for multi-pulses and a write strategy for a single pulse are respectively listed with respect to an ideal serial digital signal. The write strategy parameters Ttop1, Ttop2, Tlast1, Tlast2, Ttopr, Todf, Todr, and Tlast respectively correspond to certain edge delays (or edge shifts), and the write strategy parameter Tmp corresponds to a certain pulse width. In addition, the write strategy parameters such as the OD power, the write power, and the bias power shown in FIG. 5 respectively correspond to certain power levels.

Figure 6:
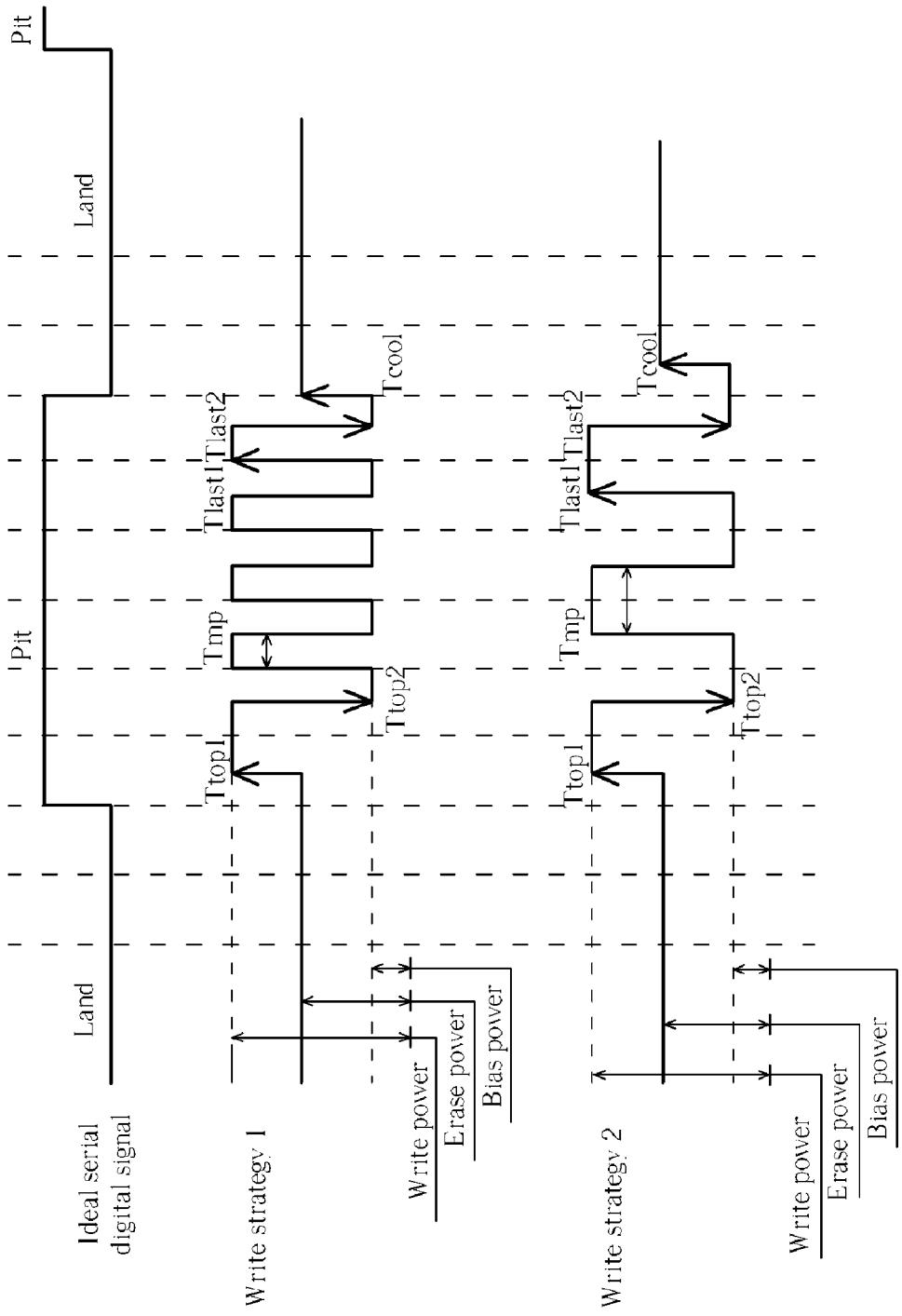
FIG. 6 illustrates write strategy parameters that can be respectively tuned by utilizing the length deviation statistics according to different embodiments of the present invention.

FIG. 6 illustrates the write strategy parameters that can be respectively tuned by utilizing the length deviation statistics according to different embodiments of the present invention, where the write strategy parameters shown in FIG. 6 are applicable to writing DVD-RW discs, and the write strategy parameters of a first write strategy (i.e. the "Write strategy 1" shown in FIG. 6) and a second write strategy (i.e. the "Write strategy 2" shown in FIG. 6) are listed with respect to an ideal serial digital signal. The write strategy parameters Ttop1, Ttop2, Tlast1, Tlast2, and Tcool respectively correspond to certain edge delays (or edge shifts), and the write strategy parameter Tmp corresponds to a certain pulse width. In addition, the write strategy parameters such as the write power and the bias power shown in FIG. 6 respectively correspond to certain power levels.

Figure 7:
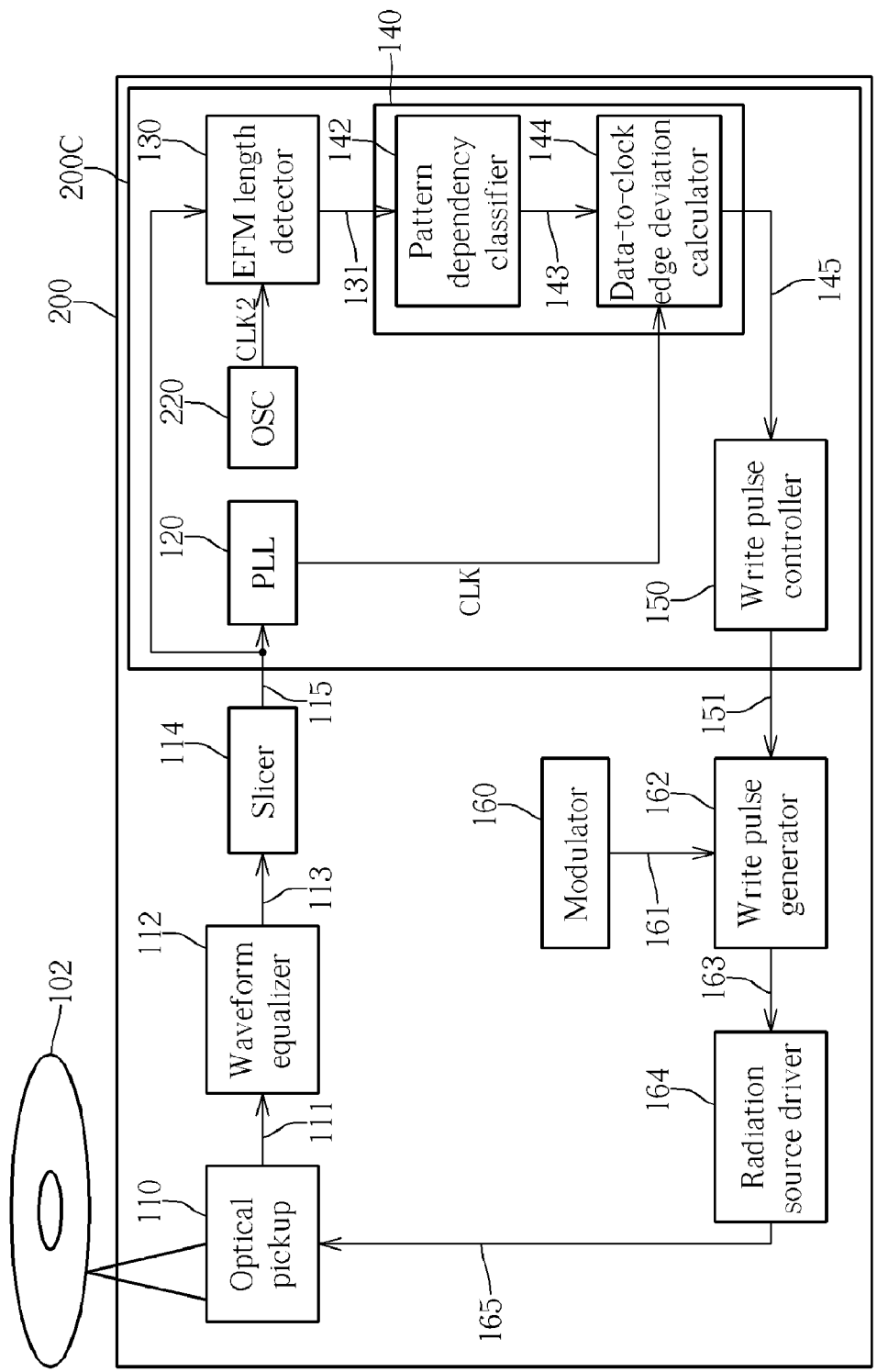
FIG. 7 is a block diagram of a system for tuning write strategy parameters of an optical storage device according to one embodiment of the present invention.

FIG. 7 is a block diagram of a system 200C for tuning write strategy parameters of an optical storage device 200 according to a second embodiment of the present invention. The second embodiment is similar to the first embodiment, where the differences are described as follows. The reference signal inputted into the EFM length detector 130 is a reference clock CLK2 generated by an oscillator 220. It is not necessary for the frequency of the reference clock CLK2 to be equal to the frequency of the EFM data clock CLK.

Figure 8:
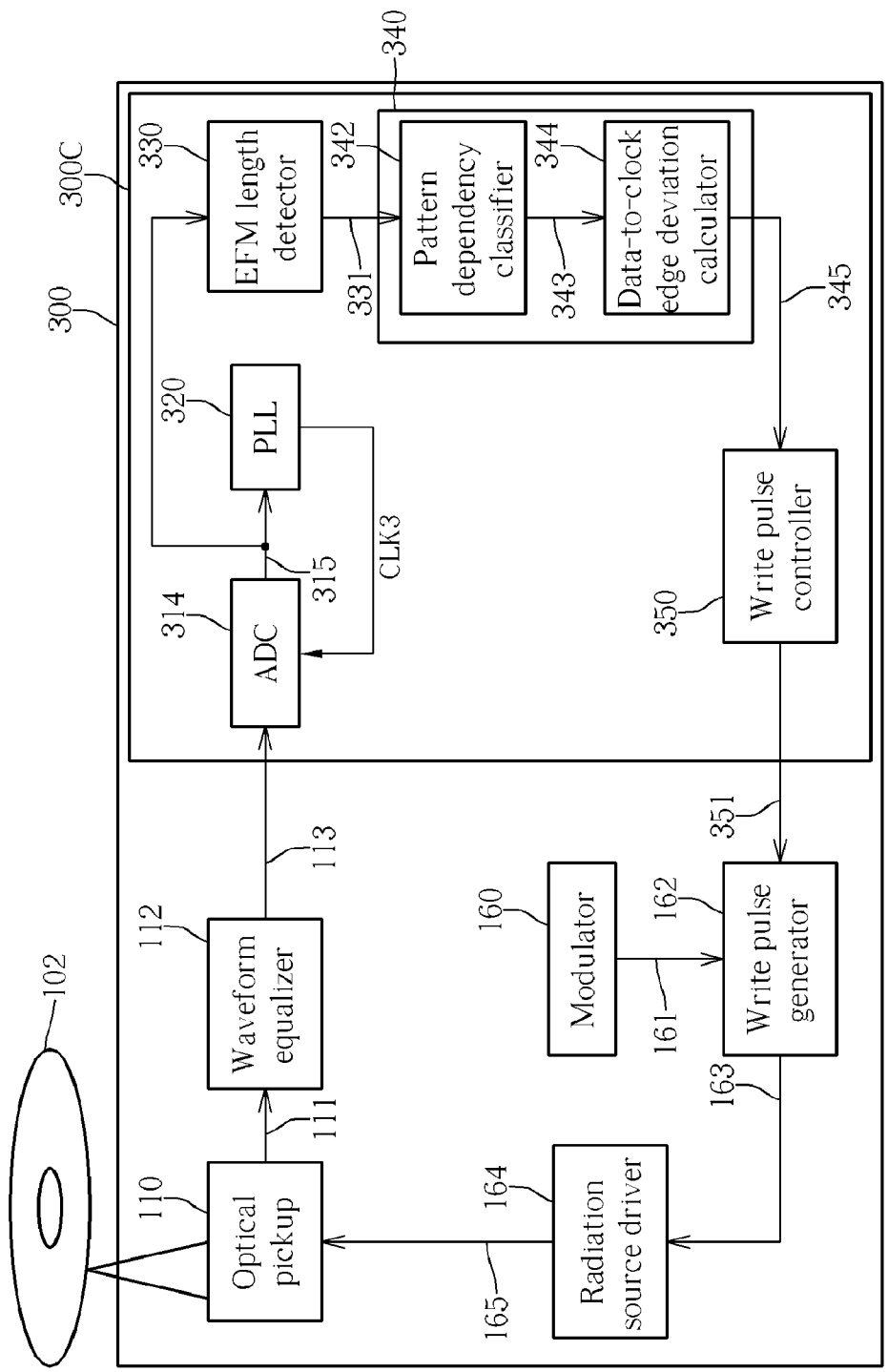
FIG. 8 is a block diagram of a system for tuning write strategy parameters of an optical storage device according to one embodiment of the present invention.

FIG. 8 is a block diagram of a system 300C for tuning write strategy parameters of an optical storage device 300 according to a third embodiment of the present invention. The third embodiment is similar to the first embodiment, where the differences are described as follows. The system 300C comprises a sampling circuit coupled to the waveform equalizer 112 to receive the reproduced signal such as the RF signal 113. The sampling circuit is utilized for sampling the reproduced signal to generate a digital signal, which is a digital RF signal 315 in this embodiment. As shown in FIG. 8, the sampling circuit comprises an analog-to-digital converter (ADC) 314 and a PLL 320. The ADC 314 performs analog-to-digital conversion on the RF signal 113 according to a reference clock CLK3 to generate the digital RF signal 315, and the PLL 320 generates the reference clock CLK3 according to the digital RF signal 315.

The system 300C further comprises an EFM length detector 330, a calculation module 340, and a write pulse controller 350, where the calculation module 340 comprises a pattern dependency classifier 342 and a data-to-clock edge deviation calculator 344. The signal utilized for detecting the lengths is the digital RF signal 315, not the sliced signal 115. The EFM length detector 330 detects intervals between time points by observing the value of the digital RF signal 315, and generates the lengths of the intervals, where each interval corresponds to a pit or a land. The boundary of the intervals can be determined by a predetermined value, for example, a middle value between a maximum value and a minimum value carried by the digital RF signal 315, e.g. an average of the maximum and minimum values. Such a middle value plays a role like the slicing level mentioned in the previous embodiments.

Figure 9:
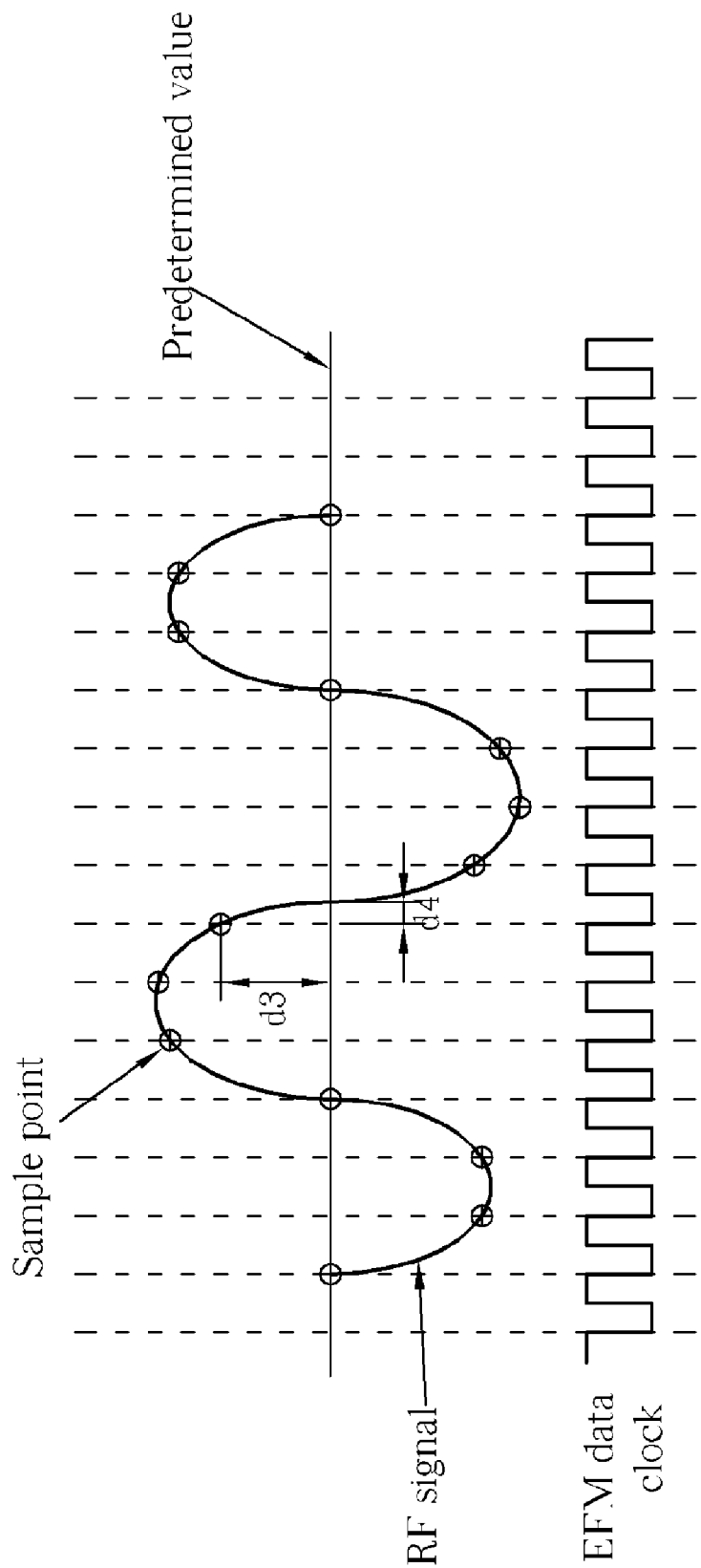
FIG. 9 illustrates sample points on a reproduced signal with respect to an EFM data clock, where a difference between a specific sample point's value and a predetermined value is utilized for representing a data-to-clock edge deviation according to one embodiment of the present invention.

FIG. 9 illustrates sample points (which are drawn with "⊕") on a reproduced signal such as the RF signal 113, where a difference d3 between a specific sample point's value and a predetermined value (for example, the middle value mentioned above) can be an indication for a data-to-clock edge deviation d4. According to the waveform of the RF signal shown in FIG. 9, most of the sample points crossing the predetermined value are perfectly aligned to falling edges of the EFM data clock, so the values of most data-to-clock edge deviations are zero. The specific sample point's value mentioned above means a value sampled at the specific sampling time and carried by the digital RF signal 315. Differences between sample points' value and the predetermined value (for example, the difference d3) can represent data-to-clock edge deviations (for example, the data-to-clock edge deviation d4), and the lengths and the data-to-clock edge deviations can be derived accordingly. Therefore, the calculation module 340 may derive the data-to-clock edge deviations by calculating differences between a predetermined value (for example, the middle value) and the value of the digital RF signal 315 around the time points when the value of the digital RF signal 315 crosses the predetermined value.

Here, the pattern dependency classifier 342 performs the same function as the pattern dependency classifier 142 while the EFM length detector 330 may output lengths L and P carried by the output signal 331 similar to the output signal 131. The data-to-clock edge deviation calculator 344 of this embodiment calculates the data-to-clock edge deviations utilizing the approached direct line mentioned above. In addition, the write pulse controller 350 performs the same function as the write pulse controller 150 while the calculation module 340 may output the data-to-clock edge deviations carried by the output signal 345 similar to the output signal 145.

Figure 10:
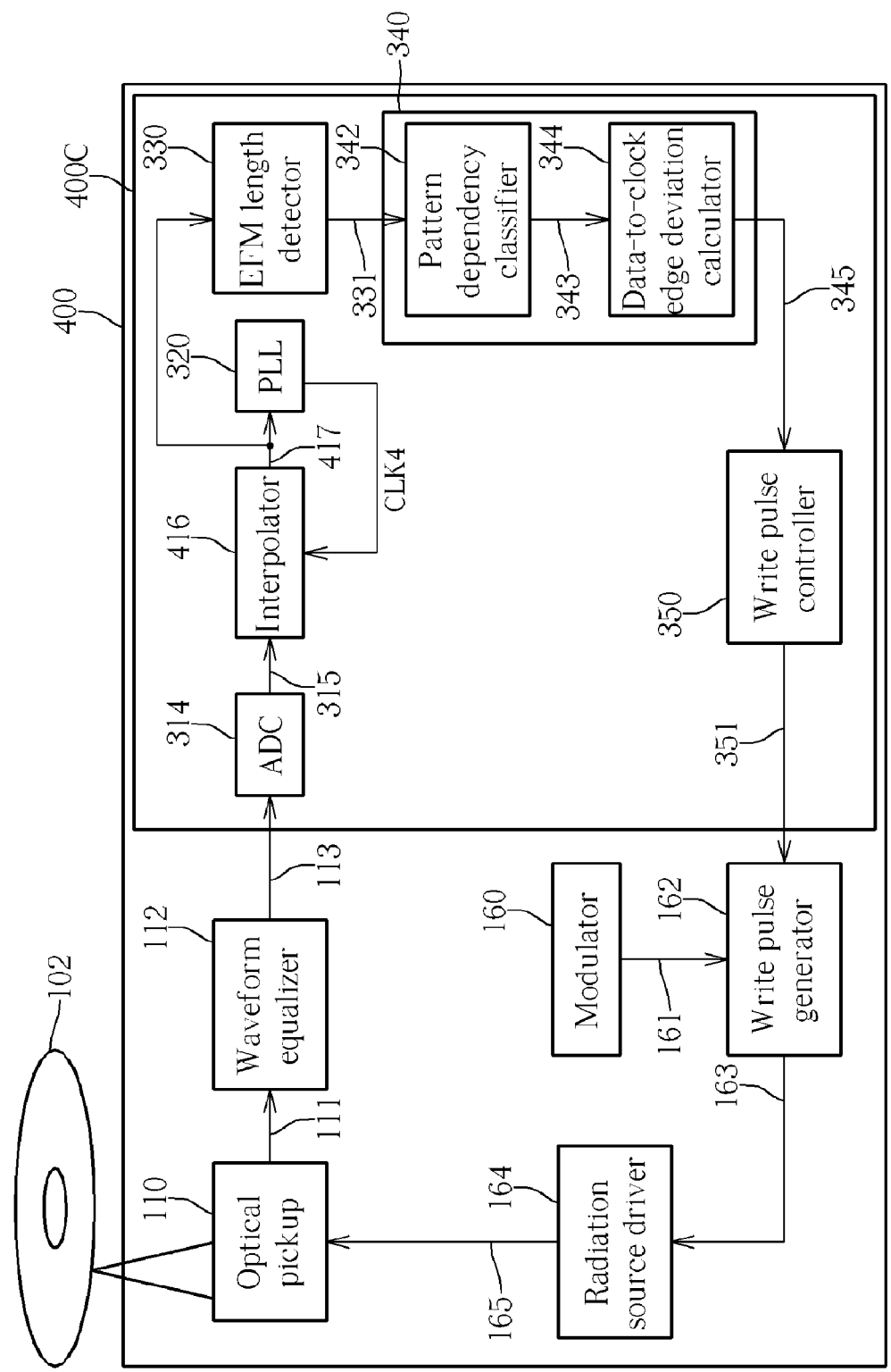
FIG. 10 illustrates a variation of the embodiment shown in FIG. 8.

FIG. 10 illustrates a variation of the embodiment shown in FIG. 8, where an interpolator 416 coupled between the ADC 314 and the PLL 320 is utilized. The PLL 320 generates a reference clock CLK4 according to an interpolated signal 417 generated by the interpolator 416, and the interpolator 416 performs an interpolation operation according to the digital RF signal 315 and the reference clock CLK4. In this variation, the input of the EFM length detector 330 is replaced with the interpolated signal 417. Operation principles of the interpolator 416 are well known in the art and therefore not described in detail here.

Figure 11:
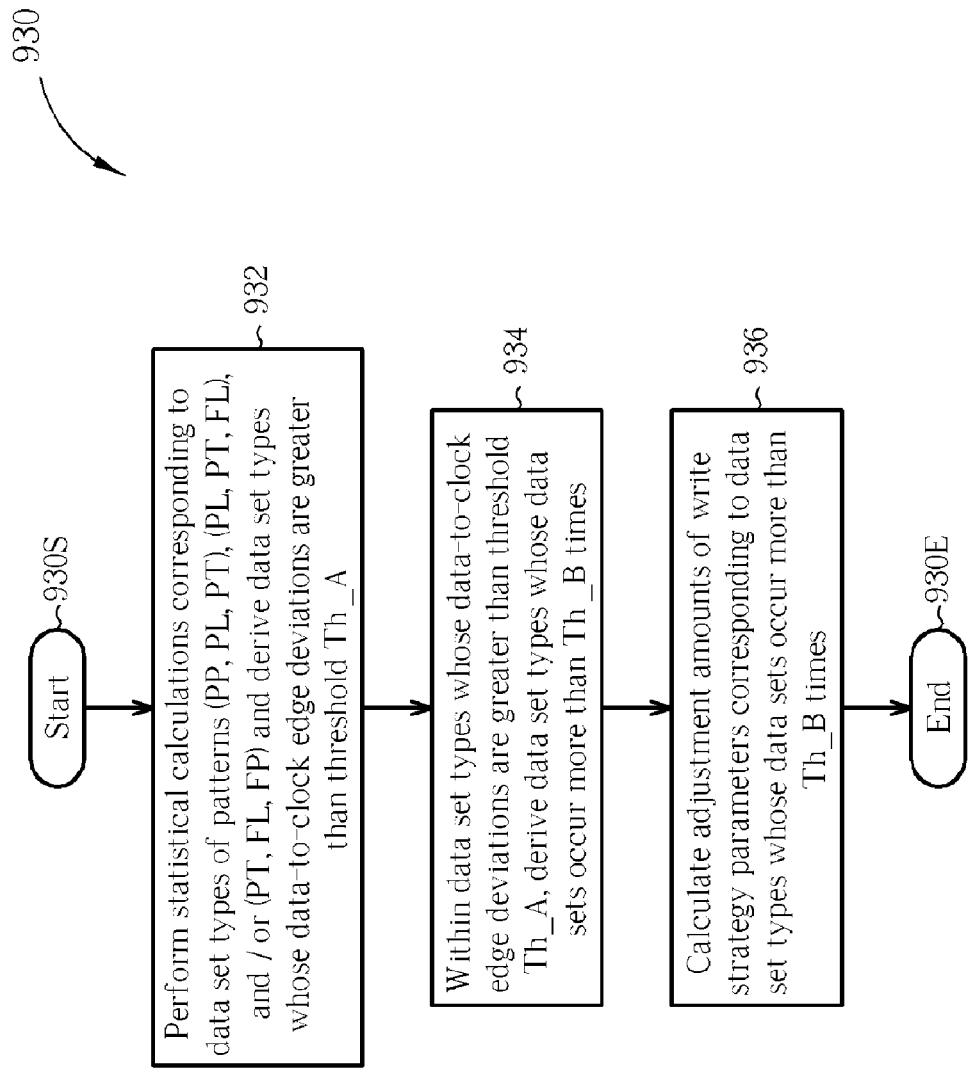
FIG. 11 is a flowchart of detailed implementation of statistical calculations according to one embodiment of the present invention.

FIG. 11 is a flowchart of detailed implementation of the statistical calculations according to one embodiment of the present invention, where the detailed implementation shown in FIG. 11 can be applied to the embodiment shown in FIG. 4, especially Steps 918, 920, and 922.

In Step 932, perform statistical calculations corresponding to a plurality of data set types of the patterns (PP, PL, PT), (PL, PT, FL), and/or (PT, FL, FP) and derive the data set types whose data-to-clock edge deviations are greater than a threshold Th_A. For example, Th_A=0.3T.

In Step 934, within the data set types whose data-to-clock edge deviations are greater than the threshold Th_A, derive the data set types whose data sets occur more than Th_B times, where the threshold Th_B is a positive integer. For example, Th_B=256.

In Step 936, calculate the adjustment amounts of the write strategy parameters corresponding to the data set types whose data sets occur more than Th_B times.

It is noted that according to the present invention, the statistical calculations can be performed to determine the corresponding distribution curves of the lengths L and/or P. According to the present invention, information of certain characteristics of the distribution curves, for example, the shapes of the distribution curves, half height widths thereof, and/or areas cut by the thresholds Th_A and Th_B, can be utilized for determining whether to tune the write strategy parameters and for determining the adjustment amounts of the write strategy parameters.

Figure 12:
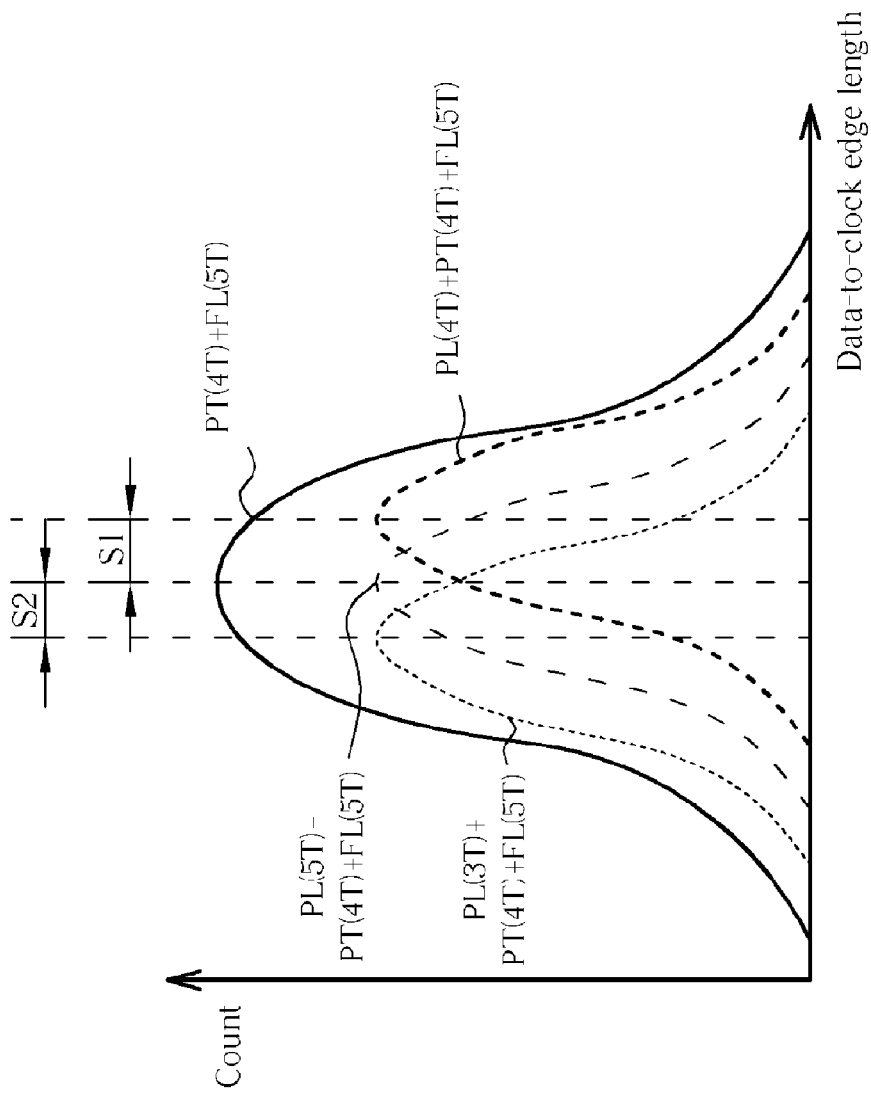
FIG. 12 and FIG. 13 illustrate curves of sample counts with respect to data-to-clock edge lengths before and after tuning the write strategy parameters according to one embodiment of the present invention.
Figure 13:
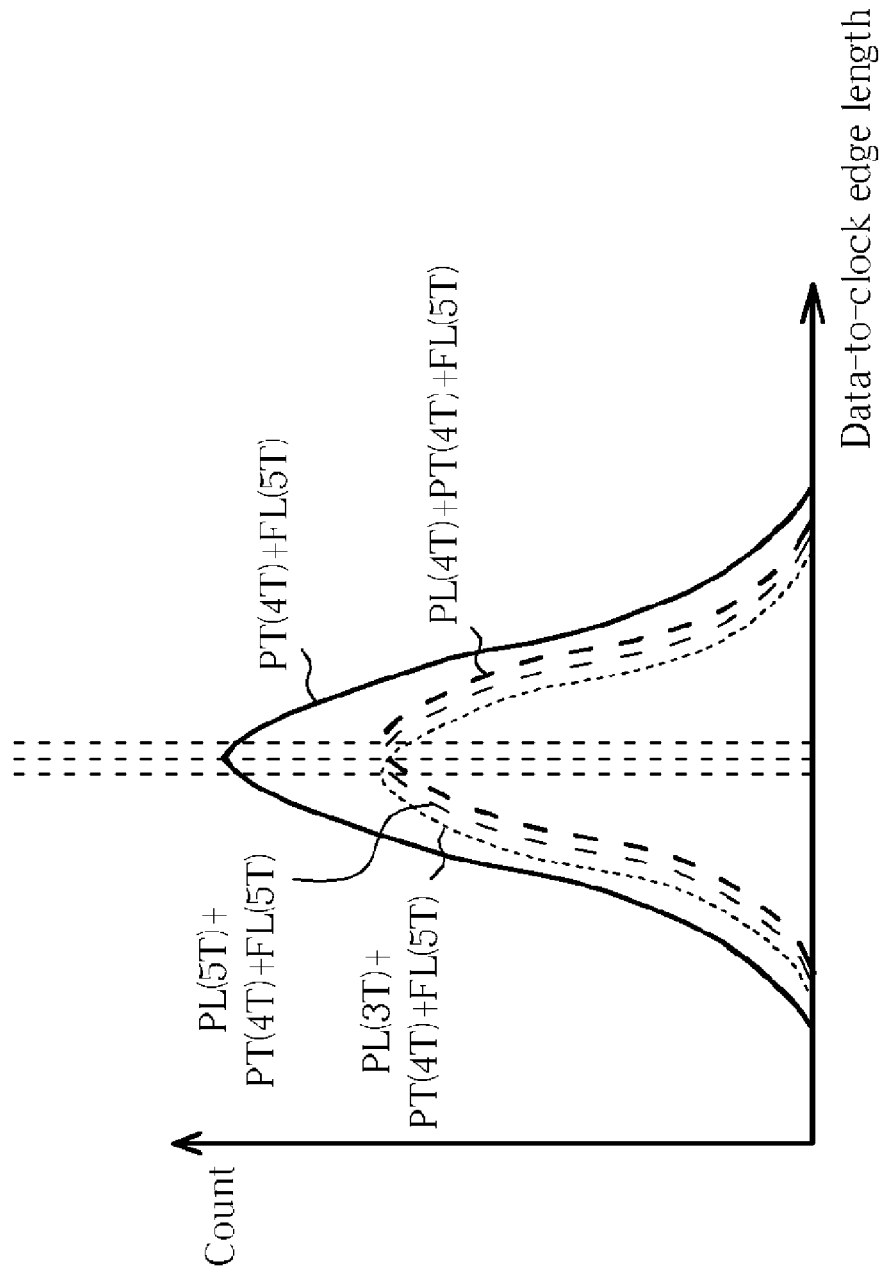

FIG. 12 and FIG. 13 illustrate curves of sample counts with respect to data-to-clock edge lengths before and after tuning the write strategy parameters according to one embodiment of the present invention. As shown in FIG. 12, regarding the combination "PT(4T)+FL(5T)" corresponding to (PT, FL)= (4T, 5T), the curve thereof is centered at a certain value (e.g., zero). In addition, the curve of the combination "PL(3T)+PT (4T)+FL(5T)" corresponding to (PL, PT, FL)=(3T, 4T, 5T) is centered at the certain value minus S2, the curve of the combination "PL(4T)+PT(4T)+FL(5T)" corresponding to (PL, PT, FL)=(4T, 4T, 5T) is centered at the certain value plus S1, and the curve of the combination "PL(5T)+PT(4T)+FL(5T)" corresponding to (PL, PT, FL)=(5T, 4T, 5T) is also centered at the certain value. Thus, according to this embodiment, the write strategy parameters can be tuned while centering the three lower curves shown in FIG. 12 at the same value or at values that are closer to each other to narrow the upper curve shown in FIG. 12. As a result, the differences S1 and S2 are reduced as shown in FIG. 13.

It should be noted that the present invention could be implemented by means of hardware including a plurality of distinct elements, or by means of a suitably programmed computer. In the system claims detailing a plurality of means, several means can be embodied by the same hardware or software device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning a plurality of write strategy parameters of an optical storage device, comprising: writing data on an optical storage medium utilizing a plurality of write strategy parameters; reading data written on the optical storage medium to generate a reproduced signal detecting a plurality of lengths according to a sliced signal, each length corresponding to a pit or a land on an optical storage medium accessed by the optical storage device; performing calculations corresponding to a plurality of data set types comprising a pit-land-pit data set type and/or a land-pit-land data set type, and generating a plurality of data-to-clock edge deviations respectively corresponding to the data set types, wherein each of the data set types corresponds to a combination of at least a specific target pit length and a specific target land length, or a combination of at least a specific target land length and a specific target pit length; and the data-to-clock edge deviations are generated according to a first reference clock and the reproduced signal; and calibrating the write strategy parameters respectively corresponding to the data set types utilizing the data-to-clock edge deviations.

2. The method of claim 1, wherein the step of detecting the lengths further comprises:
    detecting the lengths according to a reproduced signal generated by the optical storage device accessing the optical storage medium.

3. The method of claim 2, wherein the step of detecting the lengths further comprises:
    slicing the reproduced signal to generate a sliced signal; and
    detecting intervals between rising edges and falling edges of the sliced signal and/or intervals between falling edges and rising edges of the sliced signal as the lengths, wherein each interval corresponds to a pit or a land.

4. The method of claim 3, wherein the step of performing calculations corresponding to the data set types and generating the data-to-clock edge deviations respectively corresponding to the data set types further comprises:
  calculating a plurality of data-to-clock edge lengths, each data-to-clock edge length being an interval between a rising or falling edge of a first reference clock and a rising or falling edge of the sliced signal; and
  calculating a plurality of differences to generate the data-to-clock edge deviations respectively corresponding to the data set types, each difference being a difference between a data-to-clock edge length and a target data-to-clock edge length, wherein the target data-to-clock edge length is a predetermined value corresponding to a specific data set type or an average of a plurality of data-to-clock edge lengths corresponding to a specific data set type.

5. The method of claim 4, further comprising:
  generating the first reference clock according to the sliced signal.

6. The method of claim 5, wherein the step of generating the first reference clock according to the sliced signal further comprises generating the first reference clock utilizing a phase-locked loop (PLL), and the step of detecting the lengths further comprises:
  detecting the lengths according to the first reference clock.

7. The method of claim 5, wherein the step of generating the first reference clock according to the sliced signal further comprises generating the first reference clock utilizing a phase-locked loop (PLL), and the step of detecting the lengths further comprises:
  generating a second reference clock utilizing an oscillator; and
  detecting the lengths according to the second reference clock.

8. The method of claim 2, wherein the step of detecting the lengths further comprises:
  sampling the reproduced signal to generate a digital signal; and
  detecting intervals between time points when the value of the digital signal crosses a predetermined value to generate the lengths, wherein each interval corresponds to a pit or a land.

9. The method of claim 8, wherein the step of performing calculations corresponding to the data set types and generating the data-to-clock edge deviations respectively corresponding to the data set types further comprises:
  calculating differences between the value of the digital signal and the predetermined value around the time points when the value of the digital signal crosses the predetermined value to generate the data-to-clock edge deviations.

10. The method of claim 8, wherein the step of sampling the reproduced signal further comprises:
  performing analog-to-digital conversion on the reproduced signal according to a reference clock to generate the digital signal; and
  generating the reference clock according to the digital signal utilizing a phase-locked loop (PLL).

11. The method of claim 1, further comprising:
  tuning the write strategy parameters automatically on system or on chip.

12. The method of claim 1, wherein the step of performing calculations corresponding to the data set types and generating the data-to-clock edge deviations respectively corresponding to the data set types further comprises:
  classifying a plurality of data sets into the data set types, each data set comprising lengths corresponding to a pit and two adjacent lands or lengths corresponding to a land and two adjacent pits, respectively; and
  calculating the data-to-clock edge deviations respectively corresponding to the data set types.

13. The method of claim 1, wherein in the step of performing calculations corresponding to the data set types and generating the data-to-clock edge deviations respectively corresponding to the data set types, each of the data set types corresponds to a combination of a specific target pit length and specific target land lengths, or a combination of a specific target land length and specific target pit lengths.

14. The method of claim 1, wherein the step of performing calculations corresponding to the data set types and generating the data-to-clock edge deviations respectively corresponding to the data set types further comprises:
  deriving the data set types whose data-to-clock edge deviations are greater than a first threshold;
  within the data set types whose data-to-clock edge deviations are greater than the first threshold, deriving the data set types whose data sets occur more than the times indicated by a second threshold; and
  calculating the adjustment amounts of the write strategy parameters corresponding to the data set types whose data sets occur more than the times indicated by the second threshold;
  wherein the adjustment amounts are utilized for tuning the write strategy parameters.

15. A system for tuning a plurality of write strategy parameters of an optical storage device, comprising: an optical pickup for writing data on an optical storage medium utilizing a plurality of write strategy parameters and reading data written on the optical storage medium to generate a reproduced signal; a detector for detecting a plurality of lengths, each length corresponding to a pit or a land on the optical storage medium accessed by the optical storage device; a calculation module coupled to the detector for performing calculations corresponding to a plurality of data set types comprising a pit-land-pit data set type and/or a land-pit-land data set type and generating a plurality of data-to-clock edge deviations respectively corresponding to the data set types, wherein each of the data set types corresponds to a combination of at least a specific target pit length and a specific target land length, or a combination of at least a specific target land length and a specific target pit length, and the data-to-clock edge deviations are generated according to a first reference clock and the reproduced signal; and a controller coupled to the calculation module, the controller calibrating the write strategy parameters respectively corresponding to the data set types utilizing the data-to-clock edge deviations.

16. The system of claim 15, wherein the detector detects the lengths according to a reproduced signal generated by the optical storage device accessing the optical storage medium.

17. The system of claim 16, further comprising:
  a slicer for slicing the reproduced signal to generate a sliced signal;
  wherein the detector detects intervals between rising edges and falling edges of the sliced signal and/or intervals between falling edges and rising edges of the sliced signal as the lengths, and each interval corresponds to a pit or a land.

18. The system of claim 17, wherein the calculation module calculates a plurality of data-to-clock edge lengths and a plurality of differences to generate the data-to-clock edge deviations respectively corresponding to the data set types, wherein each data-to-clock edge length is an interval between a rising or falling edge of a first reference clock and a rising or falling edge of the sliced signal, and each difference is a difference between a data-to-clock edge length and a target data-to-clock edge length, wherein the target data-to-clock edge length is a predetermined value corresponds to a specific data set type or an average of a plurality of data-to-clock edge lengths corresponding to a specific data set type.

19. The system of claim 18, further comprising:
a phase-locked loop (PLL) for generating the first reference clock according to the sliced signal;
wherein the detector and the calculation module are coupled to the PLL, and the detector detects the lengths according to the first reference clock.

20. The system of claim 18, further comprising:
a phase-locked loop (PLL) for generating the first reference clock according to the sliced signal; and
an oscillator for generating a second reference clock;
wherein the detector is coupled to the oscillator and detects the lengths according to the second reference clock, and the calculation module is coupled to the PLL.

21. The system of claim 16, further comprising:
a sampling circuit for sampling the reproduced signal to generate a digital signal;
wherein the detector is coupled to the sampling circuit and detects intervals between time points when the value of the digital signal crosses a predetermined value to generate the lengths, and each interval corresponds to a pit or a land.

22. The system of claim 21, wherein the calculation module calculates differences between the predetermined value and the value of the digital signal around the time points when the value of the digital signal crosses the predetermined value to generate the data-to-clock edge deviations.

23. The system of claim 21, wherein the sampling circuit further comprises:
an analog-to-digital converter (ADC) for performing analog-to-digital conversion on the reproduced signal according to a reference clock to generate the digital signal; and
a phase-locked loop (PLL) coupled to the ADC for generating the reference clock according to the digital signal.

24. The system of claim 21, wherein the sampling circuit further comprises:
an analog-to-digital converter (ADC) for performing analog-to-digital conversion on the reproduced signal;
an interpolator coupled to the ADC for performing an interpolation operation according to a reference clock and results generated by the ADC to generate the digital signal; and
a phase-locked loop (PLL) coupled to the interpolator for generating the reference clock according to the digital signal.

25. The system of claim 15, wherein the write strategy parameters are tuned automatically on system or on chip.

26. The system of claim 15, wherein the calculation module further comprises:
a pattern dependency classifier for classifying a plurality of data sets into the data set types, each data set comprising lengths corresponding to a pit and two adjacent lands or lengths corresponding to a land and two adjacent pits, respectively; and
a data-to-clock edge deviation calculator coupled to the pattern dependency classifier for calculating the data-to-clock edge deviations respectively corresponding to the data set types.

27. The system of claim 15, wherein in the calculations performed by the calculation module, each of the data set types corresponds to a combination of a specific target pit length and specific target land lengths, or a combination of a specific target land length and specific target pit lengths.

28. The system of claim 15, wherein the system is substantially the optical storage device.

29. The system of claim 15, wherein the system is a circuit positioned in the optical storage device, or the system is a circuit coupled to the optical storage device.

30. The system of claim 15, wherein the calculation module derives the data set types whose data-to-clock edge deviations are greater than a first threshold, within the data set types whose data-to-clock edge deviations are greater than the first threshold, the calculation module derives the data set types whose data sets occur more than the times indicated by a second threshold, and the calculation module calculates the adjustment amounts of the write strategy parameters corresponding to the data set types whose data sets occur more than the times indicated by the second threshold; wherein the adjustment amounts are utilized for tuning the write strategy parameters.

* * * * *